July 5, 1927.
J. W. WILLIAMS
1,634,701
SPRAYING APPARATUS
Filed Oct. 14, 1926
4 Sheets-Sheet 1
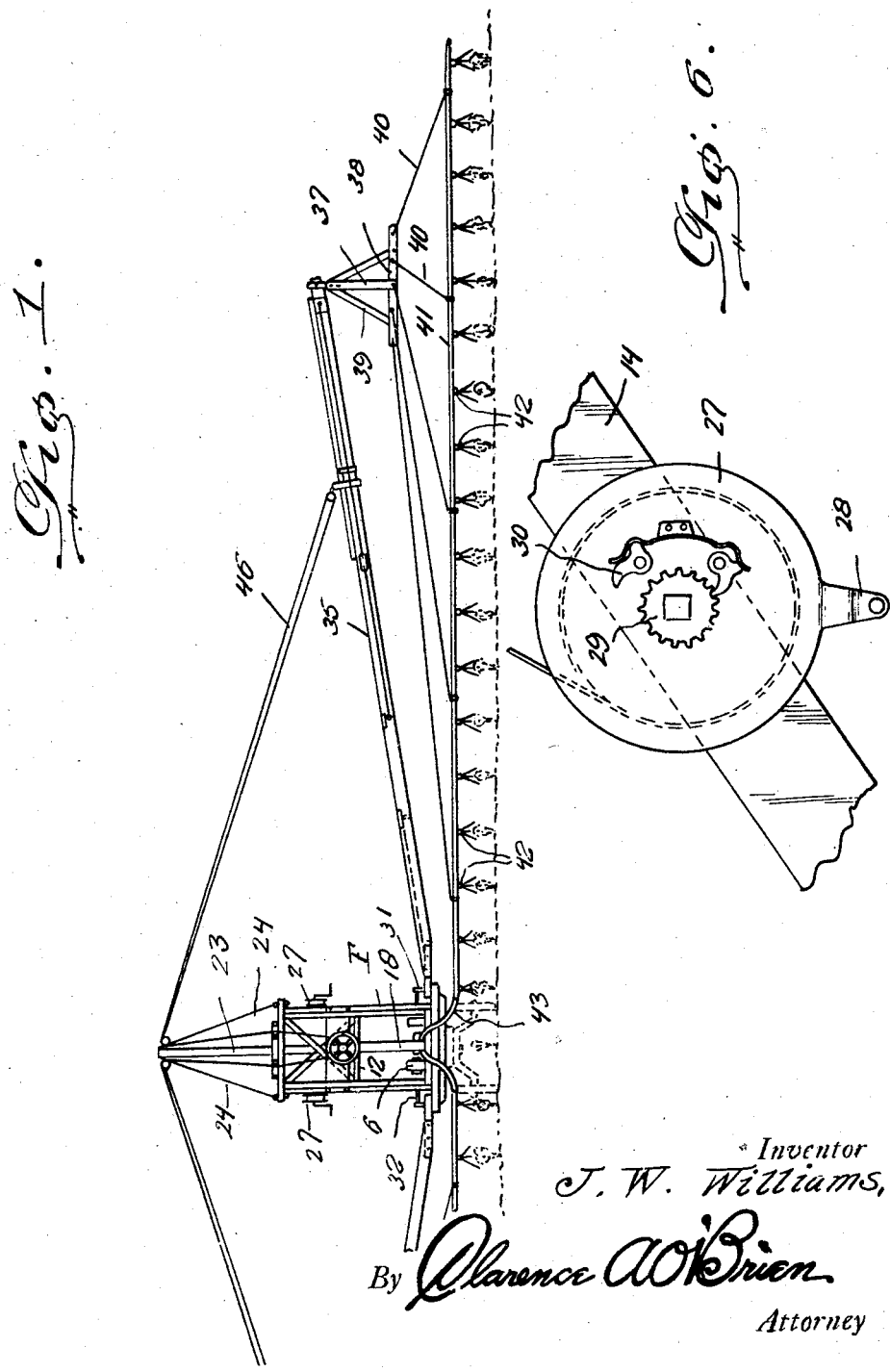
Inventor
J. W. Williams,
By Clarence A. O'Brien
Attorney

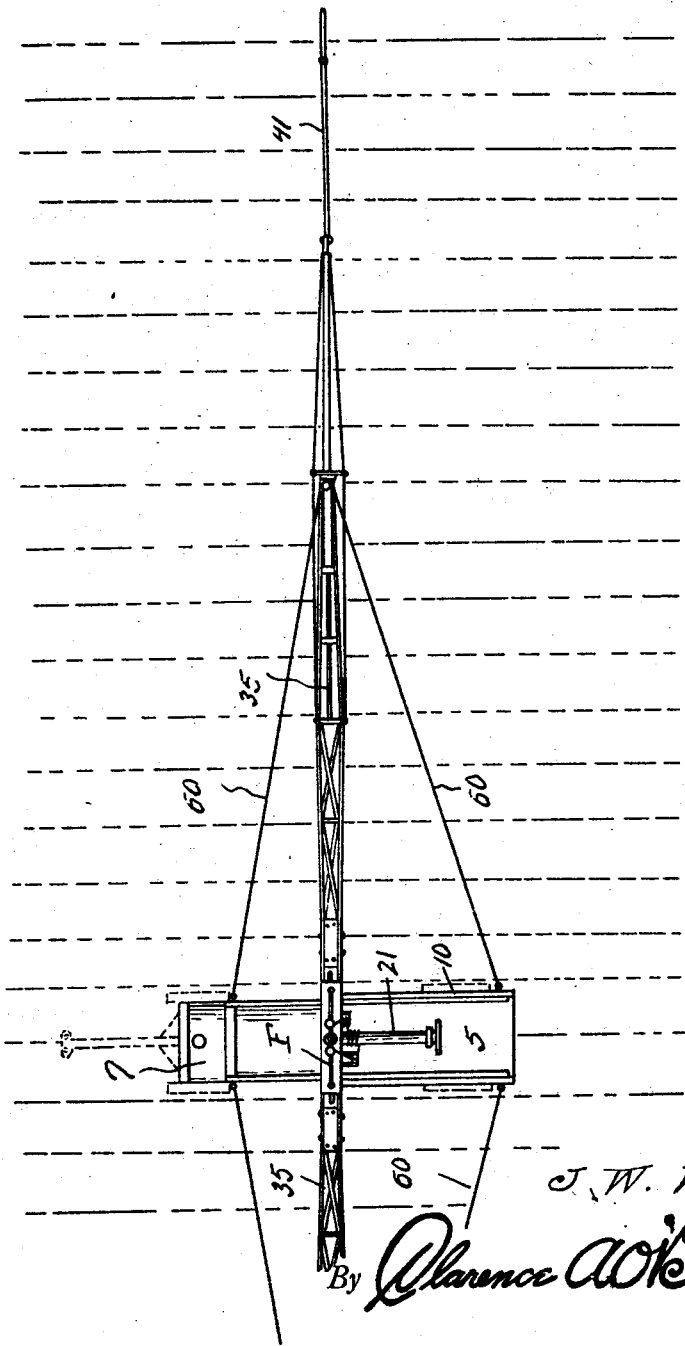

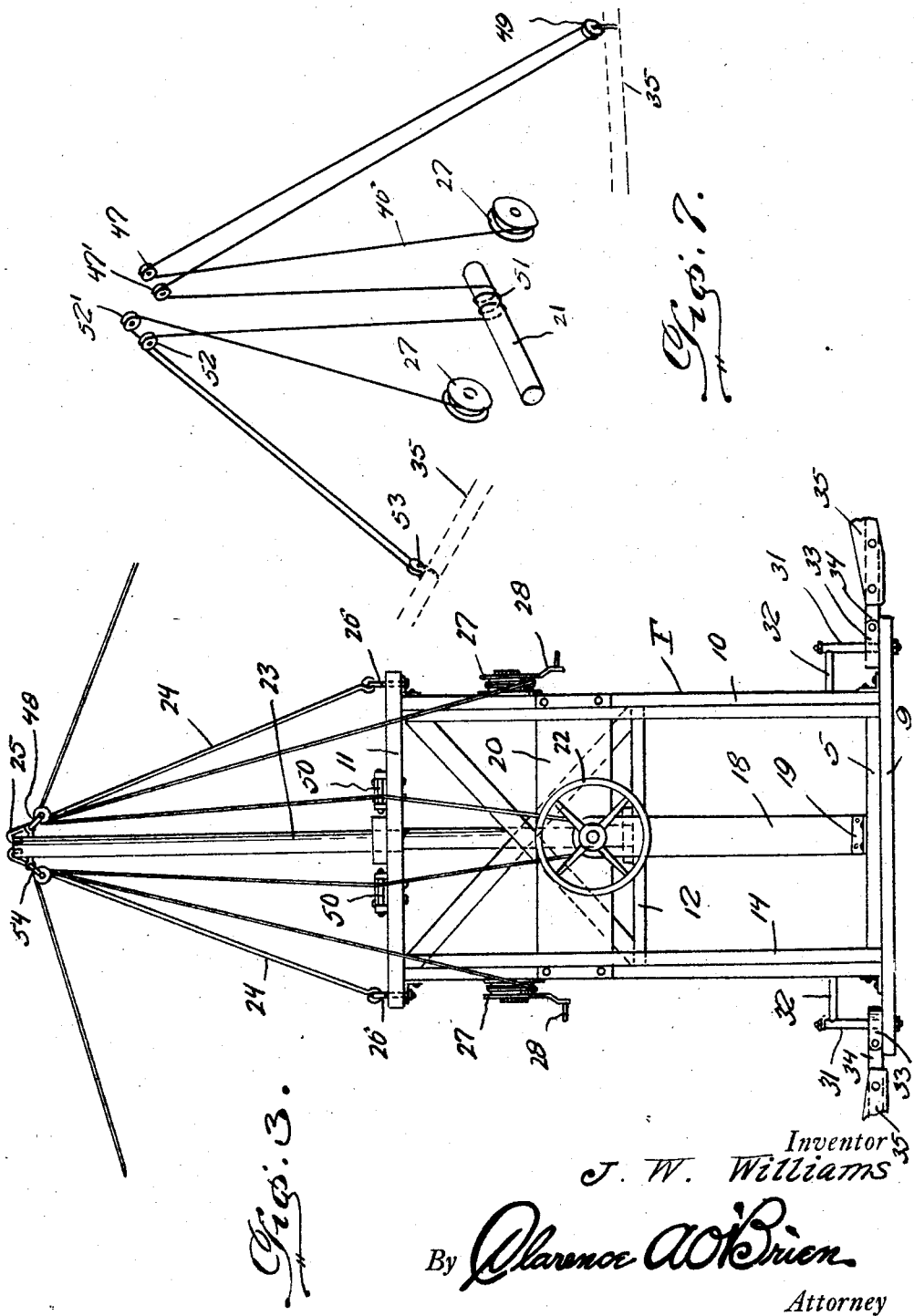

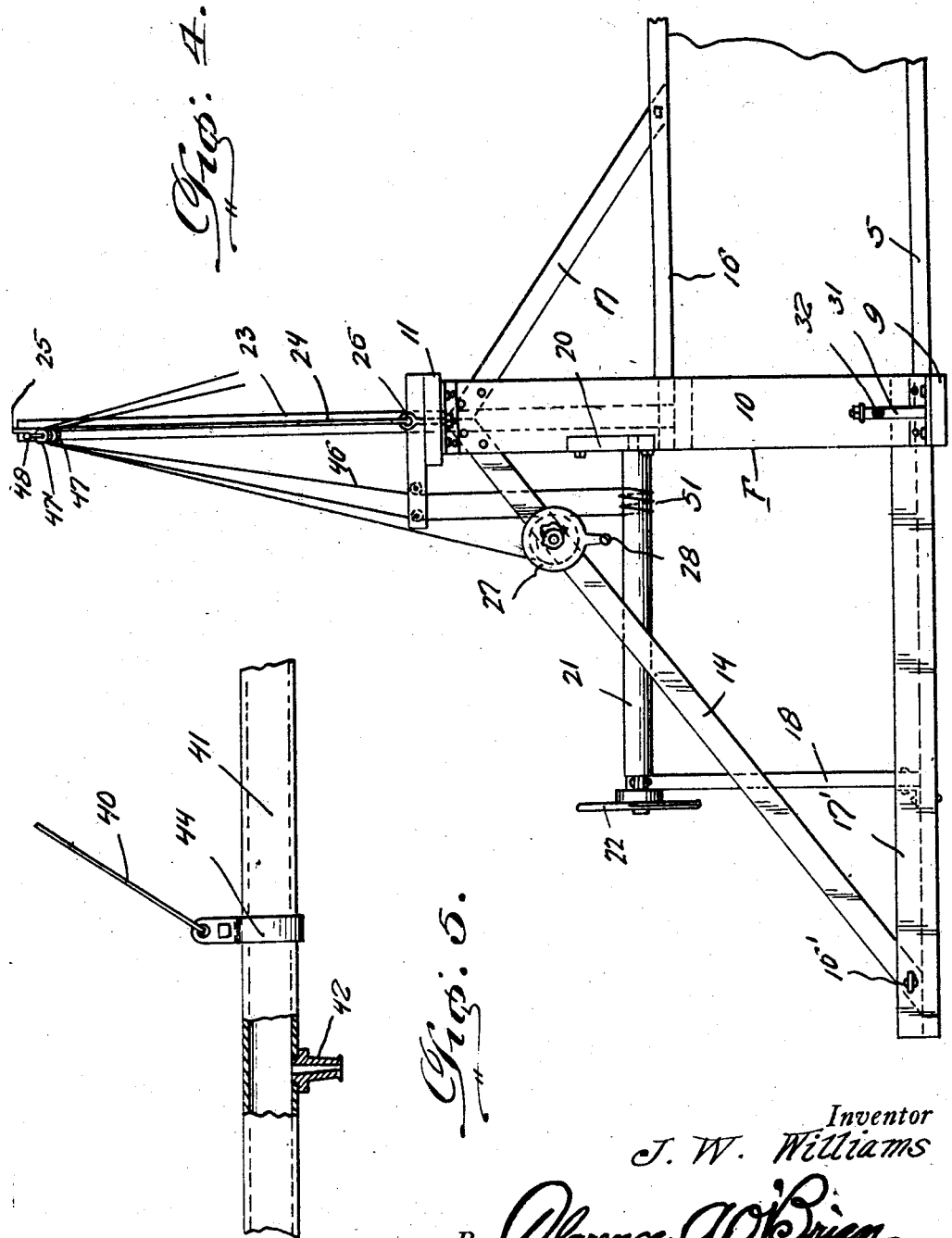

Patented July 5, 1927.

1,634,701

UNITED STATES PATENT OFFICE.

JOHN W. WILLIAMS, OF SOUTH MIAMI, FLORIDA.

SPRAYING APPARATUS.

Application filed October 14, 1926. Serial No. 141,552.

The present invention relates to a spraying apparatus and is, in part, a continuation of my pending application, Serial No. 25,842, filed April 25, 1925.

An important object of the invention is to provide an apparatus of this nature which may be mounted on a wagon or any other suitable wheeled structure in order that plants may be efficiently sprayed from a suitable mixture in a comparatively short span of time.

Another important object of the invention is to provide a spraying apparatus of this nature which is easy to manipulate, the spraying devices being mounted so that they may be readily moved as may be required.

A further very important object of the invention is to provide a spraying apparatus of this nature which possesses an exceedingly simple construction, one which is thoroughly reliable in operation, not likely to easily become out of order, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a fragmentary rear elevation of the apparatus embodying the features of my invention, Figure 2 is a fragmentary top plan view thereof, Figure 3 is an enlarged detail rear elevation, Figure 4 is an enlarged detail side elevation, Figure 5 is a detail sectional elevation of one of the spraying pipes, Figure 6 is a detail elevation of one of the winding screws, Figure 7 is a perspective diagrammatic view of the elevating cable structure.

Referring to the drawings in detail, it will be seen that the numeral 5 denotes a base which may be mounted on any suitable wheeled vehicle such as the wagon shown in dotted lines in Figs. 1 and 2 by way of example. On this platform 5 there will be conveniently mounted a suitable pump 6 and supply tank 7. The pump and supply tank do not form a part of the present invention and any suitable devices of this nature may be used.

A frame F rises from an intermediate portion of the base 5 and includes a bottom cross member 9 which projects outwardly beyond the side edges of the base 5, a pair of vertical uprights 10 and a top cross member 11 and an intermediate cross member 12. A pair of braces 14 incline downwardly and rearwardly from the upper portions of the uprights 10 and the lower ends of these braces 14 are secured as at 16' to side boards 17' mounted on the longitudinal edges of the base 5. Side rails 16 project forwardly from the uprights perpendicularly thereto in parallelism with the base 5 and braces 17 connect the rails with the upper portions of the uprights 10. These braces 17 incline downwardly and forwardly from the top portions of the uprights as clearly illustrated in Fig. 4. A post 18 rises from the base 5 adjacent the rear end thereof between the braces 14 being anchored to the base 5 by an angle iron bracket 19 or in any other suitable manner. This post 18 terminates at a level a little higher than the intermediate cross piece 12. A cross member 20 is mounted in the rear edges of the uprights 10 a little above the cross member 12 and a winch 21 is journaled in the upper end of the post 18 and in the cross member 20. A hand wheel 22 is associated with the rear end of the winch 21 for rotation of the same. A pole 23 rises from the intermediate cross piece 12 and pierces an opening in the center of the top cross piece 11 and extends upwardly therefrom. Brace rods 24 are hooked as at 25 over the upper end of the pole 23 and are anchored by eye bolts 26 to the extremities of the upper cross member 11. Spools 27 are mounted for rotation on the uprights 10 of the frame F being operable by hand cranks 28 and having associated therewith toothed wheels 29 with which there is associated pairs of spring-pressed pawls 30. These spools 27 are located on the braces 14 rearwardly of the uprights 10 as is more clearly shown in Fig. 4.

Pintles 31 rise from the extremities of the bottom cross member 9 and are braced in respect to the uprights 10 by rods 32. Strap irons 33 extend about the pintles and engage with links 34 which are secured to booms 35. The booms 35 are constructed to be light and strong being trestle-like in their formation. Links 37 are pivotally engaged with the extremities of the booms 35 and depend therefrom and have mounted at their lower ends cross heads 38 which are braced to the links by braces 39. A plurality of cables 40 are engaged with the cross heads 38 and are attached at spaced intervals to the spraying pipes 41 which have incorporated therein a plurality of detachable nozzles 42. Suitable flexible hose 43 are associated with the inner ends of the pipes in order that they may be communicated with the source of spray material. The brackets 44 for engaging about the pipe 41 so that the cables 40 may be anchored thereto, are shown to advantage in Fig. 5.

Particular attention is now directed to Figs. 1, 3 and 4 taken in conjunction with the diagrammatic view shown in Fig. 7. From an inspection of these figures it will be seen that a cable 46 is anchored to one spool 27 and is trained over a pulley 47 mounted in a bracket 48 at the top of the pole 23 and is then trained over a pulley 49 mounted on one of the booms 35 and then is extended upwardly to be trained over another pulley 47' on the same bracket 48 with the pulley 47 and then extends downwardly being guided over anti-friction device 50 and wrapped several times about the winch 21 as is indicated at 51 and then extends upwardly over a pulley 52, then downwardly and trained over a pulley 53 on the other boom 35 and then upwardly and trained over another pulley 52' on the same bracket 54 with pulley 52 and then downwardly and anchored to the other spool 27. It will be understood that the ends of the cable 46 are wrapped several times about the spools 27 thus being anchored so as to allow some play in the amount of cable provided.

From the above detailed description it will be readily apparent that when it is desired to raise one boom and lower the other boom, this may be accomplished by proper manipulation of the winch 21 through the hand wheel 22. If it is desired to operate the booms by lowering them or raising them independently, this can be accomplished by the manipulation of the spools 27.

It is preferable to brace the intermediate portions of the booms 35 in relation to the ends of the base by cables 60 as is shown to advantage in Fig. 2.

From the above detailed description it will be apparent that I have devised a spraying apparatus with which it is possible to quickly spray a large field. The apparatus is designed primarily for spraying an anti-freezing mixture on plants and, of course, this must be done quickly when cold weather is anticipated in certain climates. The booms may be very quickly and easily adjusted so as to dispose the spray pipes at the proper height and they may be quickly and easily swung to extend these pipes at the desired angles from the sides of the vehicle on which the apparatus may be mounted.

It will be further apparent that the present embodiment of the invention which I have described in detail attains all the features of advantage enumerated as desirable in the statement of the invention and the above description. It is further apparent that numerous changes in the details of construction, in the materials, in the sizes, and in the combination and arrangement of parts may be resorted to without departing from the spirit or scope of the invention as hereinafter claimed or sacrificing any of its advantages.

Having thus described my invention what I claim as new is:

1. In combination, a platform, a spray pipe, spray nozzles attached to the pipe at intervals, a pair of booms pivotally mounted on the platform to extend outwardly therefrom, means for suspending the spray pipes from the booms, means for simultaneously raising one boom while the other boom is being lowered and vice versa, and means for raising and lowering the booms independently of each other.

2. In combination, a platform, a frame structure rising from the platform, a winch journaled in the frame structure, a pair of spools mounted on the frame structure, a pair of booms pivotally engaged on the platform to swing vertically, spray pipes suspended from the booms, and a cable attached to said spools, trained over pulleys at the top of the frame structure and over pulleys on the booms, and wrapped at its intermediate portion about the winch.

3. In combination, a platform, a frame structure rising from the platform, a winch journaled in the frame structure, a pair of spools mounted on the frame structure, a pair of booms pivotally engaged on the platform to swing vertically, spray pipes suspended from the booms, and a cable attached to said spools, trained over pulleys at the top of the frame structure and over pulleys on the booms, and wrapped at its intermediate portion about the winch, pawl and ratchet means associated with the spools.

4. A device of the class described including a base, a frame structure rising from the base, a pole supported in the frame structure and rising up above the frame structure, a winch journaled in the frame structure, a pair of spools journaled on the frame structure, a pair of booms, means for pivotally mounting the inner ends of the booms to the platform, four pulleys mounted at the top of the pole, a pulley mounted on the intermediate portion of each boom, and a cable having its intermediate portion partially wound about the winch and having runs extending therefrom respectively trained over two of the four pulleys at the top of the pole, then extending to be trained through the pulleys of the booms and then brought back to be trained over the remaining two pulleys at the top of the pole and then extending downwardly and wound about the spools and anchored thereto.

5. A device of the class described including a base, a frame structure rising from the base, a pole supported in the frame structure and rising up above the frame structure, a winch journaled in the frame structure, a pair of spools journaled on the frame structure, a pair of booms, means for pivotally mounting the inner ends of the booms to the platform, four pulleys mounted at the top of the pole, a pulley mounted on the intermediate portion of each boom, and a cable having its intermediate portion partially wound about the winch and having runs extending therefrom respectively trained over two of the four pulleys at the top of the pole, then extending to be trained through the pulleys of the booms and then brought back to be trained over the remaining two pulleys at the top of the pole and then extending downwardly and wound about the spools and anchored thereto, pawl and ratchet means associated with the spools.

6. A device of the class described including a base, a frame structure rising from the base, a pole supported in the frame structure and rising up above the frame structure, a winch journaled in the frame structure, a pair of spools journaled on the frame structure, a pair of booms, means for pivotally mounting the inner ends of the booms to the platform, four pulleys mounted at the top of the pole, a pulley mounted on the intermediate portion of each boom, and a cable having its intermediate portion partially wound about the winch and having runs extending therefrom respectively trained over two of the four pulleys at the top of the pole, then extending to be trained through the pulleys of the booms and then brought back to be trained over the remaining two pulleys at the top of the pole and then extending downwardly and wound about the spools and anchored thereto, pawl and ratchet means associated with the spools, hanger structure depending from the outer extremities of the booms, cables extending from the hanger structure, and spray pipes suspended on said last-mentioned cables.

7. A device of the class described including a base, a frame structure rising from the base, a pole supported in the frame structure and rising up above the frame structure, a winch journaled in the frame structure, a pair of spools journaled on the frame structure, a pair of booms, means for pivotally mounting the inner ends of the booms to the platform, four pulleys mounted at the top of the pole, a pulley mounted on the intermediate portion of each boom, and a cable having its intermediate portion partially wound about the winch and having runs extending therefrom respectively trained over two of the four pulleys at the top of the pole, then extending to be trained through the pulleys of the booms and then brought back to be trained over the remaining two pulleys at the top of the pole and then extending downwardly and wound about the spools and anchored thereto, pawl and ratchet means associated with the spools, hanger structure depending from the outer extremities of the booms, cables extending from the hanger structure, and spray pipes suspended on said last-mentioned cables, said spray pipes including nozzles and flexible hosing at their inner ends.

In testimony whereof I affix my signature.

JOHN W. WILLIAMS.